US008161034B2

(12) United States Patent
Dettinger et al.

(10) Patent No.: US 8,161,034 B2
(45) Date of Patent: *Apr. 17, 2012

(54) ABSTRACT QUERY BUILDING WITH SELECTABILITY OF AGGREGATION OPERATIONS AND GROUPING

(75) Inventors: Richard D. Dettinger, Rochester, MN (US); Daniel P. Kolz, Rochester, MN (US); Richard J. Stevens, Mantorville, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/345,391

(22) Filed: Dec. 29, 2008

(65) Prior Publication Data
US 2009/0119270 A1    May 7, 2009

Related U.S. Application Data

(63) Continuation of application No. 11/469,001, filed on Aug. 31, 2006, now Pat. No. 7,472,117, which is a continuation of application No. 10/723,759, filed on Nov. 26, 2003, now Pat. No. 7,149,731.

(51) Int. Cl.
G06F 7/00 (2006.01)
G06F 17/30 (2006.01)

(52) U.S. Cl. ....................................................... 707/713

(58) Field of Classification Search .................. None
See application file for complete search history.

(56) References Cited

U.S. PATENT DOCUMENTS

| | | | |
|---|---|---|---|
| 5,734,887 A | 3/1998 | Kingberg et al. | |
| 5,884,299 A | 3/1999 | Ramesh et al. | |
| 6,553,368 B2 | 4/2003 | Martin et al. | |
| 6,629,094 B1 | 9/2003 | Colby et al. | |
| 6,725,227 B1 | 4/2004 | Li | |
| 6,928,431 B2 | 8/2005 | Dettinger et al. | |
| 6,931,418 B1 | 8/2005 | Barnes | |
| 6,954,748 B2 | 10/2005 | Dettinger et al. | |
| 6,996,558 B2 | 2/2006 | Dettinger et al. | |
| 7,024,425 B2 | 4/2006 | Krishnaprasad et al. | |
| 7,096,229 B2 | 8/2006 | Dettinger et al. | |
| 7,149,731 B2 | 12/2006 | Dettinger et al. | |
| 7,472,117 B2 | 12/2008 | Dettinger et al. | |

OTHER PUBLICATIONS

Derthick et al, "An Interactive Visualization Environment for Data Exploration", Proceedings of Knowledge Discovery in Databases, AAAI Press, Aug. 1997, pp. 2-9.

Bogdan D. Czejdo, "A Microcomputer Implementation of an ER Query and Update Interface", ACM SIGSMALL/PC Notes vol. 19, Issue 1, Jun. 1993, pp. 16-31.

Rahayu et al, "Aggregation Query Model for OODBMS", Proceedings of the Fortieth International Conference on Tools Pacific: Objects for internet, mobile and embedded application CRPIT '02, Feb. 2002, pp. 143-150.

*Primary Examiner* — Uyen T. Le
(74) *Attorney, Agent, or Firm* — Patterson & Sheridan LLP

(57) ABSTRACT

Systems and articles of manufacture for query building with selectability of aggregation operations and grouping. Abstract queries are composed on the basis of a data abstraction model abstractly describing data in the database. The abstract queries may include result criterions and aggregation operations to be performed with respect to the result criterions for generating aggregation information. An object is generated containing query entities and allowing a user to selectively (i) generate a first executable query corresponding to the abstract query inclusive of the aggregation operation and aggregation logic; and (ii) generate a second executable query corresponding to the abstract query exclusive of the aggregation operation and aggregation logic.

12 Claims, 12 Drawing Sheets

1200

Data Discovery and Query Builder

1210 → Query Builder

ENTER TITLE: [HCT%BLD STATISTICS] ← 1220

1222

RESULT CRITERIA SPECIFICATION:

RESULT FIELD: [GENDER ▼] ← 1230 [AND ▼] ← 1235

1240 → [APPLY]  [FINISHED] ← 1245

1224

SELECTION CRITERIA SPECIFICATION:

CONDITION FIELD: [HCT%BLD ▼] ← 1250 [> ▼] ← 1255

VALUE: [50] ← 1260 [AND ▼] ← 1265

1270 → [APPLY]  [FINISHED] ← 1275

FIELD TO GROUP BY: [GENDER ▼] ← 1280

[FINISHED] ← 1285

1226

QUERY SUMMARY:

```
SELECT Gender, AVG(Hct%Bld)
FROM Patientinfo, Testresults
WHERE Hct%Bld>50 AND Hct%Bld<100 AND
      Patientinfo.Patient_ID=Testresults.Patient_ID
GROUP BY Gender
```

RUN AS AGGREGATION QUERY: [X] ← 1228

1290  1292  1294  1296
[EXECUTE] [SAVE] [LOAD] [BUILD AGGREGATION QUERY]

*FIG. 12*

ABSTRACT QUERY BUILDING WITH SELECTABILITY OF AGGREGATION OPERATIONS AND GROUPING

CROSS-REFERENCE TO RELATED APPLICATIONS

This application is a continuation of U.S. patent application Ser. No. 11/469,001, filed Aug. 31, 2006 now U.S. Pat. No. 7,472,117, which is a continuation of U.S. patent application Ser. No. 10/723,759, filed Nov. 26, 2003, issued as U.S. Pat. No. 7,149,731, on Dec. 12, 2006. Each of the aforementioned related patent applications is herein incorporated by reference in its entirety.

BACKGROUND OF THE INVENTION

1. Field of the Invention

The present invention generally relates to data processing in databases and more particularly to processing aggregation queries that are executed against a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

One function supported by query languages, including SQL, is the determination of summary information. Summary information is aggregated data that is related to information being stored and managed by the DBMS. In SQL, summary information is retrieved using aggregation functions and a GROUP BY clause on SELECT operations. However, SQL as a means for getting at summary information suffers in all the same ways that SQL suffers as a language for expressing queries. More specifically, one shortcoming of SQL as a means for getting at summary information is the reliance of SQL on user involvement. For instance, assume a user who executes an initial query against a database. In response to execution of the initial query, the user receives an initial query result showing detailed information related to one or more result fields specified by the initial query. Upon studying the initial query result, the user decides to obtain summary information related to data of one or more interesting result fields. To this end, the user needs to determine the interesting result fields from the initial query and to modify the query text to specify a desired aggregation query. Assume further that subsequent to issuance of the aggregation query and receipt of the summary information, the user decides to obtain summary information related to data of one or more other interesting result fields of the initial query or that the user wants to go back to the initial query result. Accordingly, the user would again be required to determine corresponding interesting result fields or all result fields from the initial query and to modify the query text to specify either another desired aggregation query or to re-specify the initial query. In other words, for each subsequent query, modified or new query texts need to be provided by the user. Furthermore, for each subsequent aggregation query the user needs to retrieve the interesting result fields from the initial query. This is, however, cumbersome and inefficient for the user.

Therefore, there is a need for an improved and more flexible technique for handling queries in a database environment for obtaining summary information.

SUMMARY OF THE INVENTION

The present invention is generally directed to systems and articles of manufacture for processing queries that are executed against a database and, more particularly, for processing aggregation queries that are executed against a database.

One embodiment provides a computer-readable medium containing a program which, when executed by a processor, performs a process of constructing queries selectively capable of returning aggregation information related to data in a database. The process comprises receiving user input specifying at least one result criterion for an abstract query comprising one or more logical fields, each corresponding to a logical field specification of a data abstraction model abstractly describing the data in the database, each result criterion corresponding to a logical field for which data is to be returned, receiving user input specifying selection criteria for the abstract query, receiving user input specifying an aggregation operation to be performed with respect to the at least one result criterion for generating aggregation information, and associating the at least one result criterion with the aggregation operation in a manner allowing user selection of whether to perform the aggregation operation with respect to the at least one result criterion without requiring user-made changes to the abstract query.

Another embodiment provides a computer-readable medium containing a program which, when executed by a processor, performs a process of running queries selectively capable of returning aggregation information related to data in a database. The process comprises retrieving an abstract query comprising one or more logical fields, each corresponding to a logical field specification of a data abstraction model abstractly describing the data residing in the database, the one or more logical fields defining selection criteria, at least one result criterion and an aggregation operation to be performed with respect to the at least one result criterion, wherein the aggregation operation is associated with the at least one result criterion in a manner allowing user selection of whether to perform the aggregation operation with respect to the at least one result criterion without requiring user-made changes to the query, receiving user input specifying that the aggregation operation is to be applied to the at least one result criterion of the abstract query, after executing of a corresponding executable query, displaying results including aggregation information for the at least one result criterion, receiving user input specifying that the aggregation operation is not to be applied to the at least one result criterion of the abstract query, and after executing of a corresponding executable query, displaying results exclusive of aggregation information for the at least one result criterion.

Yet another embodiment provides a graphical user interface residing in memory, comprising: (a) a query conditions screen for specifying logical fields and operators to define abstract queries, the abstract queries being defined by a data abstraction model comprising metadata mapping the logical fields to physical data, (b) an aggregation screen area, comprising a result field window displaying a plurality of result fields of a given abstract query, wherein the plurality of result fields are logical fields defined by the data abstraction model, and a plurality of graphical selection elements for each of a plurality of selectable aggregation operations applicable to the result fields, and (c) a grouping screen area displaying the plurality of result fields and wherein each selection of one of the plurality of result fields defines a result group for the given query, (d) a first selection element for specifying whether the given query comprising user selections made from aggregation screen area and the grouping screen area will be executed as an aggregation query or a non-aggregation query, wherein the aggregation query returns summary information comprising each result group and values calculated by applying selected ones of the plurality of selectable aggregation operations to selected ones of the plurality of result fields, and (e) a second selection element for initiating execution of the given query as the aggregation query or the non-aggregation query according to the selection made through the first selection element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 12 is a screen shot illustrating an interface showing an exemplary query builder in one embodiment.

DETAILED DESCRIPTION OF THE PREFERRED EMBODIMENTS

Introduction

Figure 1:
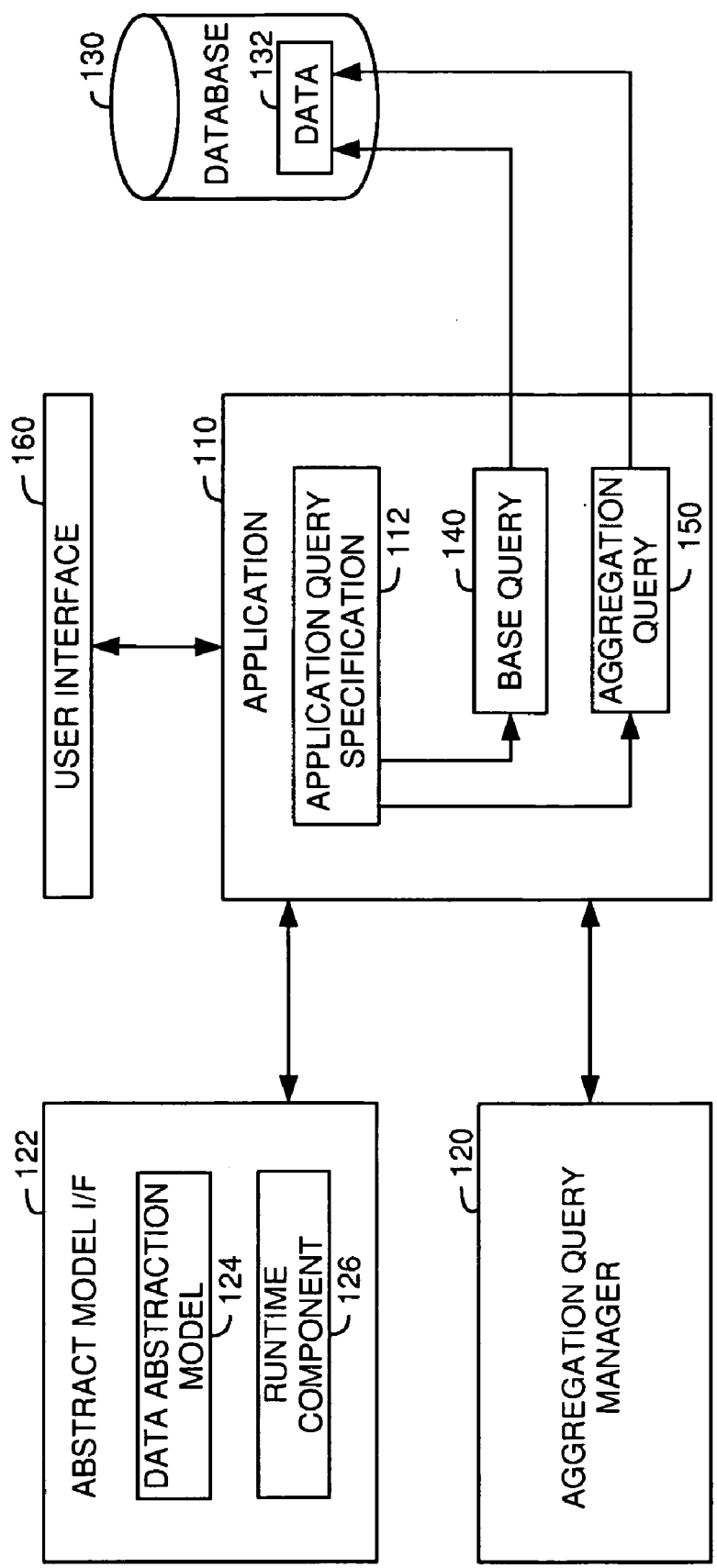
FIG. 1 is a relational view of software components in one embodiment.

The present invention is generally directed to a method, system and article of manufacture for processing queries that are executed against a database and, more particularly, for processing aggregation queries that are executed against a database. Aggregation queries are executed against a database to obtain summary information related to data in the database.

According to one aspect, an aggregation query can be generated by an aggregation query manager on the basis of an initial query. The initial query may include one or more result fields for which data is to be returned upon execution of the initial query against the database. The initial query and any other query that is not configured to perform an aggregation operation is also referred to herein as a base query. An aggregation operation may be associated with each result field of a base query to formulate an aggregation query. Accordingly, the aggregation query is configured to return aggregated information (i.e., summary information) related to data of all result fields having an associated aggregation operation upon execution against the database.

According to one aspect, the initial query is an abstract query. Accordingly, each result field corresponds to a logical field of a plurality of logical fields. The plurality of logical fields is defined by a logical representation of the data in the database. Each logical field abstractly describes an associated physical entity of the data. Using the logical representation, the abstract query can be transformed into a concrete query, such as a concrete SQL query that is executed against the database.

In one embodiment, an aggregation query is created using a user interface. The user interface can be configured for displaying one or more result fields, query condition operators and available aggregation and grouping operations to the user. Using suitable input devices, the user can determine query conditions and select interesting result fields and aggregation/grouping operations to be associated therewith. The determined query conditions and selected interesting result fields and aggregation/grouping operations are stored in a query data object. Using the user interface, the user can select whether to execute the query data object as a non-aggregation query or an aggregation query. For instance, the user can click a checkbox of the user interface to indicate that the query data object should be executed as an aggregation query. Based on the user selection, the aggregation query manager is invoked to generate either an aggregation query or a non-aggregation query from the query data object. The resulting query can then be submitted for execution.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of software components in one embodiment is illustrated. The software components include one or more applications 110 (only one application is illustrated for simplicity), a query aggregation manager 120, an abstract model interface 122 and a user interface 160.

According to one aspect, the application 110 (and more generally, any requesting entity including, at the highest level, users) issues queries, such as base query 140 and aggregation query 150, against data 132 in a database 130. The queries issued by the application 110 are defined according to an application query specification 112. The application query specification(s) 112 and the abstract model interface 122 are further described below with reference to FIGS. 2-5.

The queries issued by the application 110 may be pre-defined (i.e., hard coded as part of the application 110) or may be generated in response to input (e.g., user input). In one embodiment, the queries (referred to herein as "abstract queries") are composed using logical fields defined by a data abstraction model 124. The abstract queries are transformed into a form consistent with the physical representation of the data 132. For instance, the abstract queries are translated by a runtime component 126 into concrete (i.e., executable) queries which are executed against the data 132 of the database 130. The database 130 is representative of any collection of data regardless of the particular physical representation. By way of illustration, the database 130 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the application 110 uses the aggregation query manager 120 to determine information related to the base query 140. The determined information can be displayed to the user using the user interface 160 such that the user can select at least parts of the displayed information to create the aggregation query 150. If the aggregation query 150 is an abstract query, the abstract aggregation query is transformed at runtime by the runtime component 126 into a concrete aggregation query for execution. The concrete aggregation query is executed against the data 132 of the database 130 to obtain aggregation information. Interaction and operation of the application 110, the aggregation query manager 120 and the user interface 160 to obtain the aggregation information is explained in more detail below with reference to FIGS. 6-12.

Figure 2:
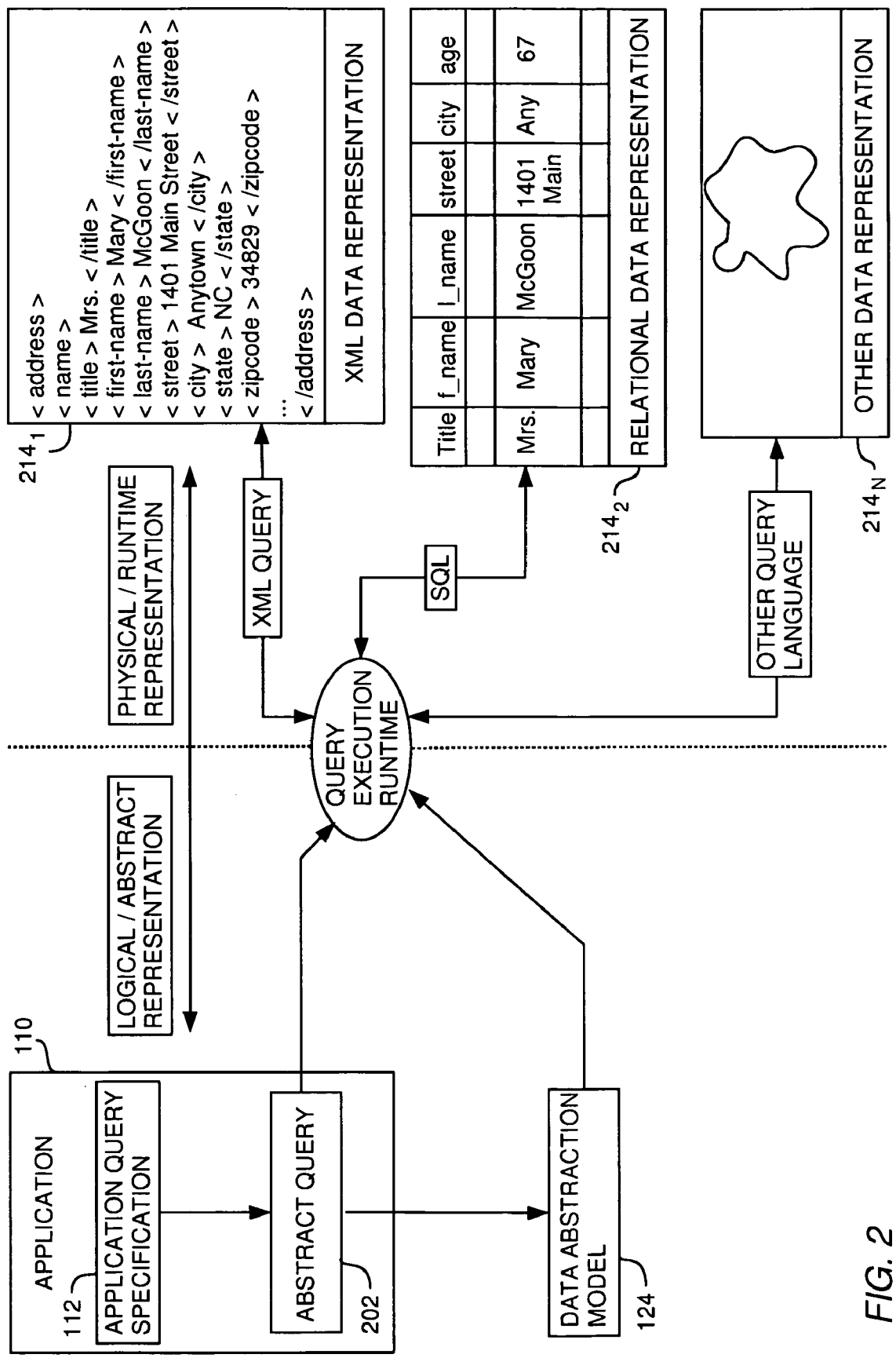
FIGS. 2-3 are relational views of software components for abstract query management.

Referring now to FIG. 2, a relational view illustrating operation and interaction of the application 110 and the abstract model interface 122 is shown. The data abstraction model 124 defines logical fields corresponding to physical entities of data in a database (e.g., database 130), thereby providing a logical representation of the data. In a relational database environment having a multiplicity of database tables, a specific logical representation having specific logical fields can be provided for each database table. In this case, all specific logical representations together constitute the data abstraction model 124. The physical entities of the data are arranged in the database 130 according to a physical representation of the data 132. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model is provided for each separate physical representation 214, as explained above for the case of a relational database environment. In an alternative embodiment, a single data abstraction model 124 contains field specifications (with associated access methods) for two or more physical representations 214.

Figure 3:
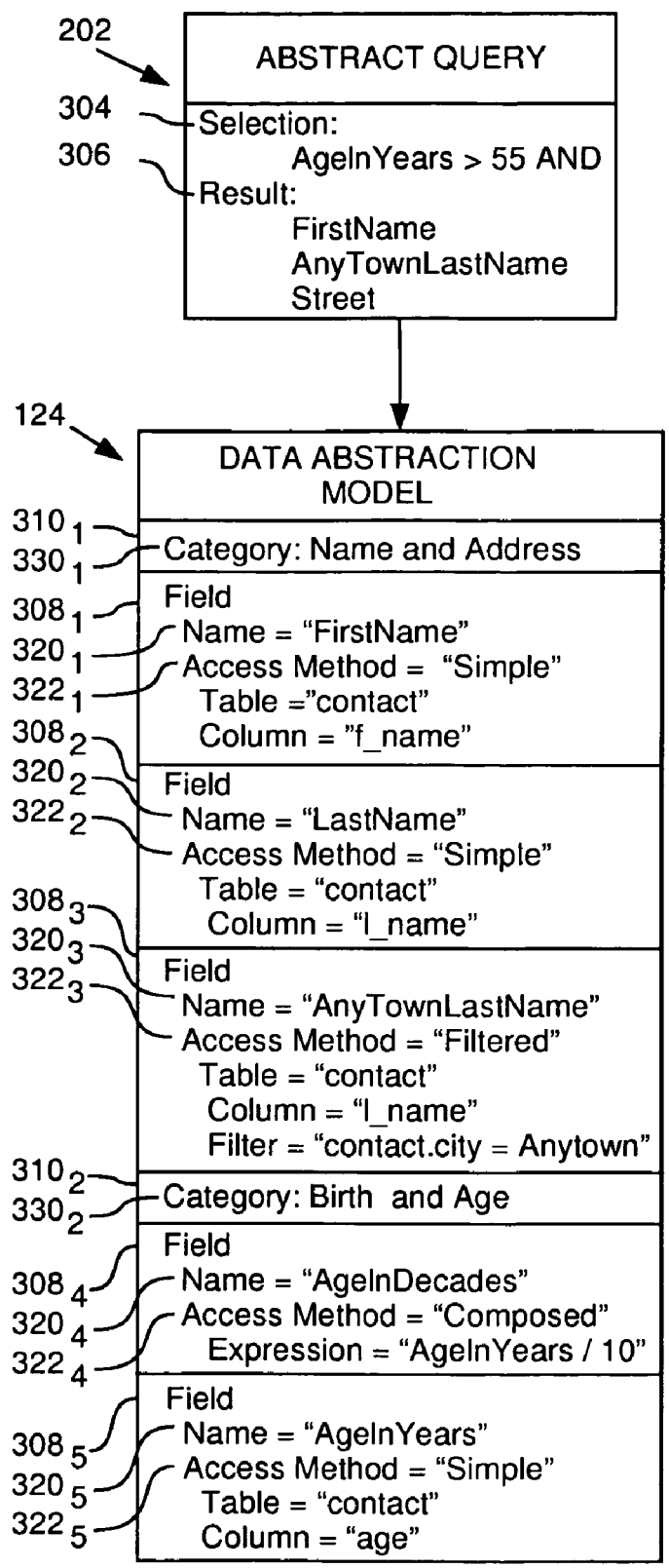

Using a logical representation of the data, the application query specification 112 specifies one or more logical fields to compose a resulting query 202 (e.g., base query 140 or aggregation query 150). A requesting entity (e.g., the application 110) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 is shown in FIG. 3. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying physical data entities in the database 130. As a result, abstract queries may be defined that are independent of the particular underlying physical data representation used. For execution, the abstract query is transformed into a concrete query consistent with the underlying physical representation of the data using the data abstraction model 124.

In general, the data abstraction model 124 exposes information as a set of logical fields that may be used within an abstract query to specify criteria for data selection and specify the form of result data returned from a query operation. The logical fields are defined independently of the underlying physical representation being used in the database 130, thereby allowing abstract queries to be formed that are loosely coupled to the underlying physical representation.

Referring now to FIG. 3, a relational view illustrating interaction of the abstract query 202 and the data abstraction model 124 is shown. In one embodiment, the data abstraction model 124 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 124 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 130). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 124 shown in FIG. 3 are representative of logical fields mapped to data represented in the relational data representation $214_2$ shown in FIG. 2. However, other instances of the data abstraction model 124 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001  <?xml version="1.0"?>
002  <!--Query string representation: (AgeInYears > "55"-->
003  <QueryAbstraction>
004    <Selection>
005      <Condition internalID="4">
006      <Condition field="AgeInYears" operator="GT" value="55"
007              internalID="1"/>
008    </Selection>
009    <Results>
010      <Field name="FirstName"/>
011      <Field name="AnyTownLastName"/>
012      <Field name="Street"/>
013    </Results>
014  </QueryAbstraction>
```

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 124 shown in FIG. 3 is shown in Table II below. By way of illustration, the illustrative Data Abstraction Model is defined using XML. However, any other language may be used to advantage.

TABLE II

DATA ABSTRACTION MODEL EXAMPLE

```
001  <?xml version="1.0"?>
002  <DataAbstraction>
003    <Category name="Name and Address">
004      <Field queryable="Yes" name="FirstName" displayable="Yes">
005        <AccessMethod>
006          <Simple columnName="f_name" tableName="contact">
              </Simple>
007        </AccessMethod>
008      </Field>
009      <Field queryable="Yes" name="LastName" displayable="Yes">
010        <AccessMethod>
011          <Simple columnName="l_name" tableName="contact">
              </Simple>
012        </AccessMethod>
013      </Field>
014      <Field queryable="Yes" name="AnyTownLastName"
            displayable="Yes">
015        <AccessMethod>
016          <Filter columnName="l_name" tableName="contact">
017          </Filter="contact.city=Anytown">
018        </AccessMethod>
019      </Field>
020    </Category>
021    <Category name="Birth and Age">
022      <Field queryable="Yes" name="AgeInDecades"
            displayable="Yes">
023        <AccessMethod>
024          <Composed columnName="age" tableName="contact">
025          </Composed Expression="columnName/10">
026        </AccessMethod>
027      </Field>
028      <Field queryable="Yes" name="AgeInYears"
            displayable="Yes">
029        <AccessMethod>
030          <Simple columnName="age" tableName="contact">
              </Simple>
031        </AccessMethod>
032      </Field>
```

TABLE II-continued

DATA ABSTRACTION MODEL EXAMPLE

```
033    </Category>
034  </DataAbstraction>
```

By way of example, note that lines 004-008 correspond to the first field specification $308_1$ of the DAM 124 shown in FIG. 3 and lines 009-013 correspond to the second field specification $308_2$.

Figure 4:
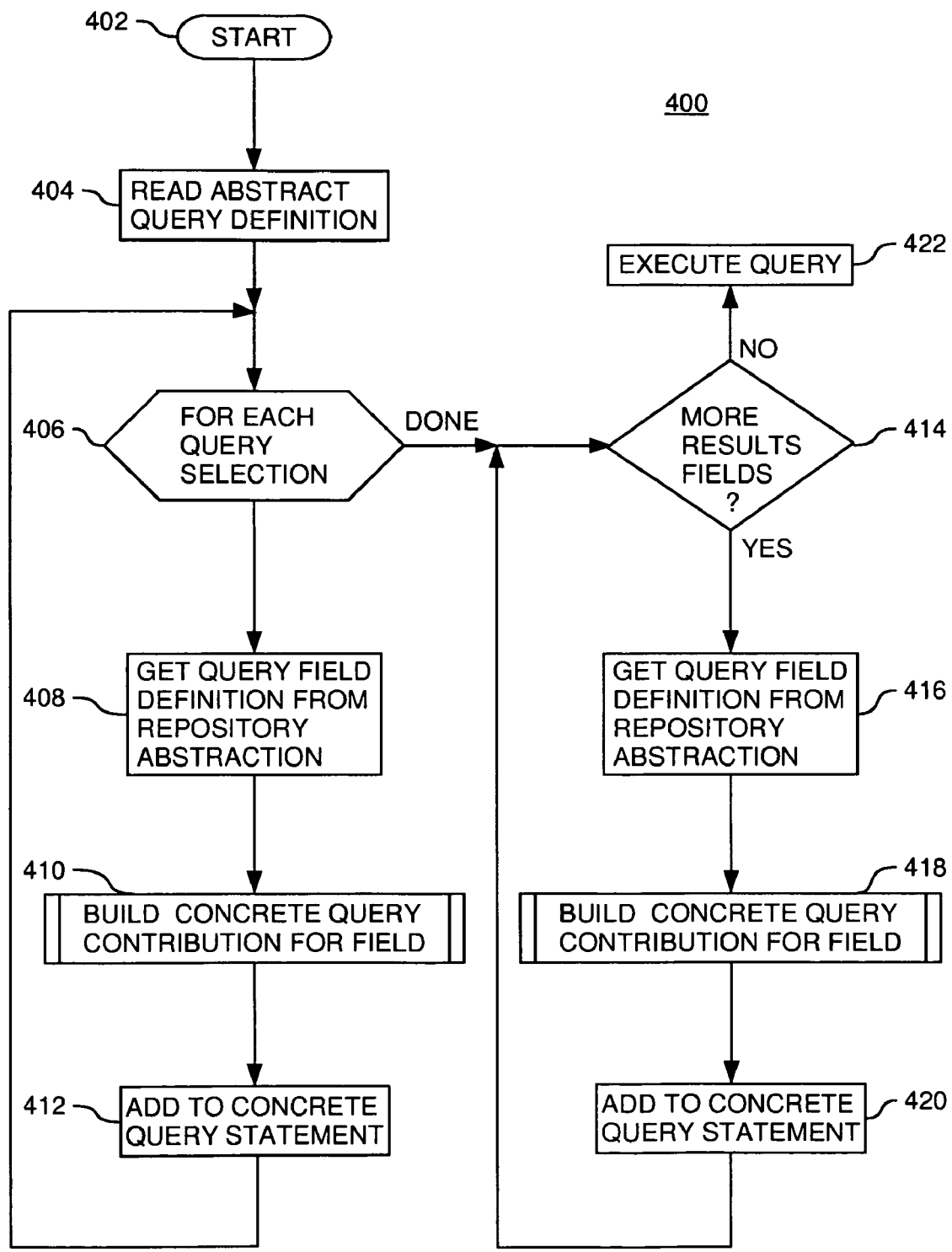
FIGS. 4-5 are flow charts illustrating the operation of a runtime component.

Referring now to FIG. 4, an illustrative runtime method 300 exemplifying one embodiment of the operation of the runtime component 126 is shown. The method 400 is entered at step 402 when the runtime component 126 receives as input an abstract query (such as the abstract query shown in Table I). At step 404, the runtime component 126 reads and parses the abstract query and locates individual selection criteria and desired result fields. At step 406, the runtime component 126 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, <, <, etc) and a value expression (what is the field being compared to). At step 408, the runtime component 126 uses the field name from a selection criterion of the abstract query to look up the definition of the field in the data abstraction model 124. As noted above, the field definition includes a definition of the access method used to access the physical data associated with the field. The runtime component 126 then builds (step 410) a concrete query contribution for the logical field being processed. As defined herein, a concrete query contribution is a portion of a concrete query that is used to perform data selection based on the current logical field. A concrete query (e.g., base query 140 or aggregation query 150 of FIG. 1) is a query represented in languages like SQL and XML Query and is consistent with the data of a given physical data repository (e.g., a relational database or XML repository). Accordingly, the concrete query is used to locate and retrieve data from the physical data repository, represented by the database 130 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 126 identifies the information to be returned as a result of query execution. As described above, in one embodiment, the abstract query defines a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 126 looks up a result field name (from the result specification of the abstract query) in the data abstraction model 124 and then retrieves a result field definition from the data abstraction model 124 to identify the physical location of data to be returned for the current logical result field. The runtime component 126 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
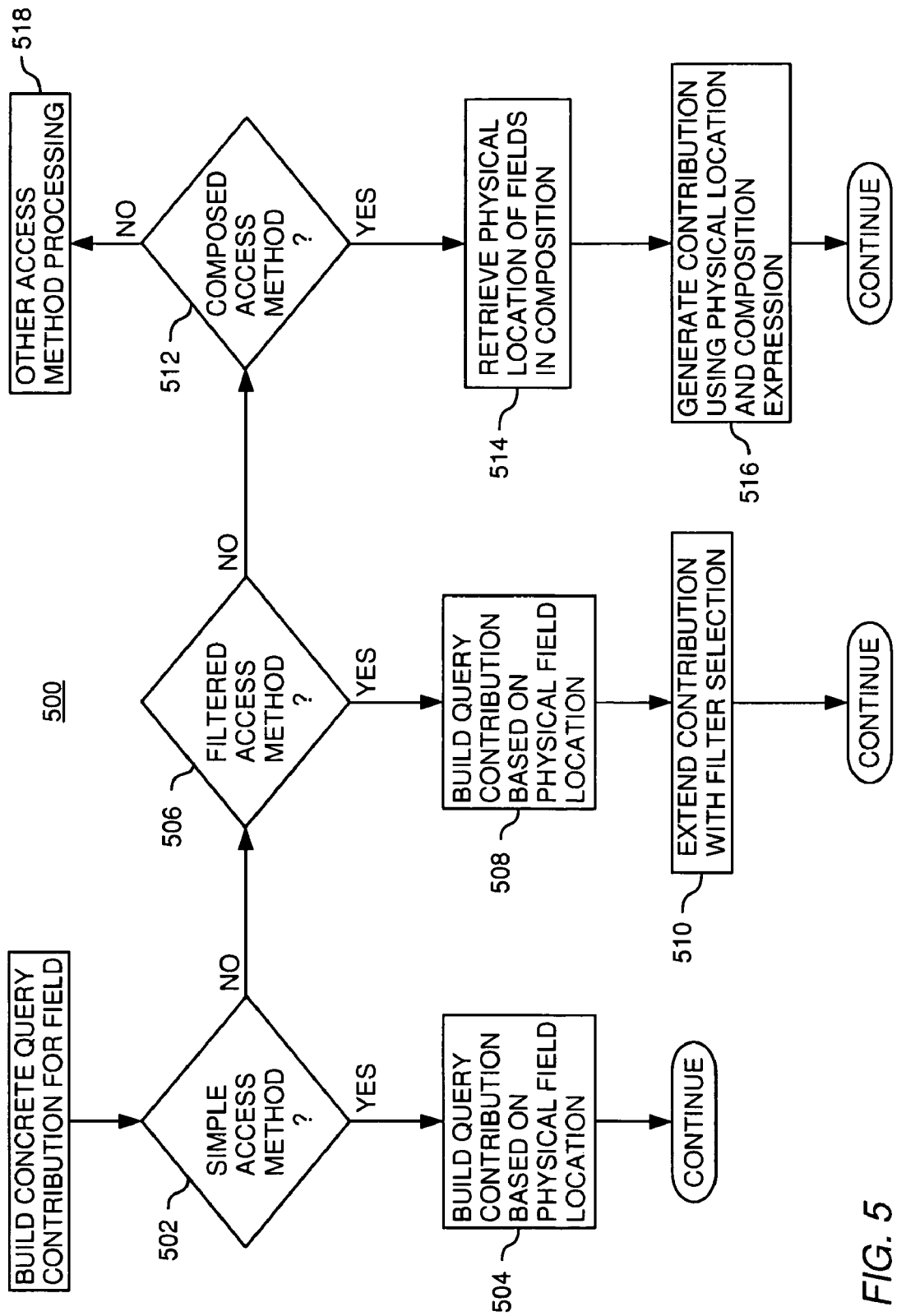

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for some physical data entity. At step 510, the concrete query contribution is extended with additional logic (filter selection) used to subset data associated with the physical data entity. Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Figure 6:
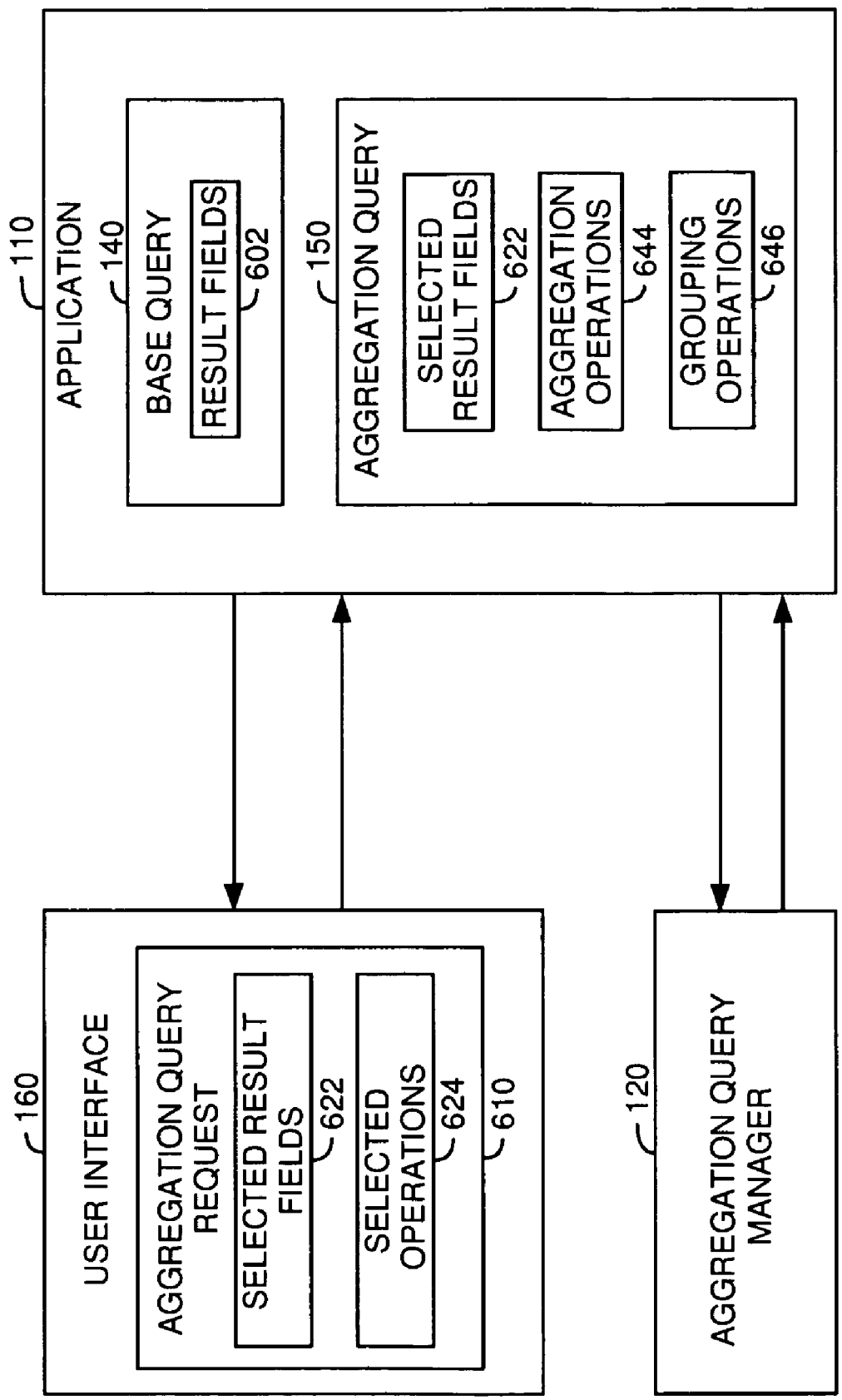
FIG. 6 is a relational view of software components in one embodiment.

Referring now to FIG. 6, one embodiment of the application 110, the aggregation query manager 120 and the user interface 160 of FIG. 1 is illustrated. The application 110, the aggregation query manager 120 and the user interface 160 operate to obtain aggregation information related to data in a database (e.g., data 132 in database 130 in FIG. 1).

In one embodiment, the user interface 160 is adapted for specification of components, such as result fields and query condition operators, of a base query. Accordingly, a requesting entity such as a user can specify the base query 140 using the user interface 160. The base query 140 illustratively includes one or more result fields 602, for which data is to be returned from the database, and one or more query conditions 604 specifying selection criteria for the data to be returned. The base query 140 is issued by the application 110.

Furthermore, the user interface 160 is adapted for specification of components of an aggregation query. Accordingly, the user interface 160 can be configured for displaying one or more available result fields of the result fields 602 and selectable operations. In one embodiment, the selectable operations include available aggregation and/or grouping operations. By way of example, the available aggregation operations include a functionality for determining at least one of an average value, a physical entity count value, a maximum value, a minimum value and a physical entity sum value. However, it should be noted that any other aggregation function can be used to advantage. In one embodiment, aggregation operations can be received as textual input from the user. Furthermore, by way of example, a grouping operation can be defined to determine by which result field an obtained query result is to be grouped.

The user can select one or more of the available result fields and associate one or more aggregation and/or grouping operations with each selected result field. Thus, using the user interface 160, the user can specify aggregation query components 610. The aggregation query components 610 illustratively include all selected result fields 622 and selected operations 624 identifying corresponding aggregation and/or grouping operations to be associated therewith.

In one embodiment, the application 110 stores the base query 140 together with the aggregation query components 610 as a query data object 620 using the aggregation query manager 120. Accordingly, the query data object 620 includes all information that the base query 140 includes, i.e., the result fields 602 and the query conditions 604. In addition, the aggregation query manager 120 adds all selected result fields 622 having associated aggregation and/or grouping operations to the query data object 620. In one embodiment, instead of adding all selected result fields 622, the aggregation query manager 120 adds indications of the selected result fields 622 to the query data object 620, so that the selected result fields 622 can be determined, when required, from the result fields 602 using the indications. Furthermore, the aggregation query manager 120 adds aggregation operations 644 and grouping operations 646 according to the selected operations 624 to the query data object 620.

In other words, the query data object 620 contains all the user-selected query information in a manner that allows execution of either the base query 140 or an aggregation query (e.g., aggregation query 150 of FIG. 1) according to user selection. User selection of how to run the query data object 620 against the database is explained in more detail below with reference to FIG. 12. Accordingly, the query data object 620 associates a result field with an aggregation operation in a manner allowing user selection of whether to perform the aggregation operation with respect to the result field without requiring user-made changes to the query data object. More specifically, if the user selects to run the query data object 620 as base query against the data in the database, only the result fields 602 and the query conditions 604 are used in creating the base query. If, however, the user selects to run the query data object 620 as an aggregation query against the data in the database, all information included in the query data object 620 is used to create the aggregation query.

In one embodiment, the aggregation query manager 120 is implemented as a program product providing aggregation function support for a transformation of the abstract aggregation query into a concrete SQL aggregation query using Java™ classes. More specifically, a ResultField class can be implemented to define a plurality of ResultField objects. Each ResultField object is defined for a specific result field and may contain at least three constituent elements: an aggregation function, a GROUP BY type, and a GROUP BY ID number. Each of these elements is optional. The aggregation function is a function that is applied to a corresponding result field and can be any valid aggregation function on a corresponding data processing system. When the aggregation query manager 120 generates corresponding SQL code for a query that includes a result field which has an aggregation function, it adds a GROUP BY statement to the SQL code. The aggregation query manager 120 adds all result fields which are identified by the GROUP BY type and GROUP BY ID information to the GROUP BY statement. The aggregation query manager 120 further adds a SELECT statement to the SQL code and adds all result fields which have an associated aggregation function or which are identified by the GROUP BY type and GROUP BY ID information thereto. In other words, the aggregation query manager 120 chooses not to include in the SELECT statement any result field that does not have an aggregation function and does not occur in the GROUP BY statement. This allows the generation of valid SQL without changes to the abstract query itself. Generation and execution of the concrete aggregation query is explained in more detailed below with respect to FIGS. 7 to 12.

One embodiment of a method 700 for providing aggregation information related to data in a database (e.g., data 132 of database 130 of FIG. 1) is explained with reference to FIGS. 7-12. At least several steps of the method 700 can be performed by an aggregation query manager (e.g., aggregation query manager 128 of FIG. 1). Method 700 starts at step 710.

At step 720, a base query (e.g., base query 140 of FIG. 1) is received. The base query may contain components which are selected using a user interface, such as the graphical user interface explained with reference to FIG. 12.

Referring now to FIG. 12, an illustrative GUI screen 1200 having a query builder window 1210 for specification of an abstract query, such as an abstract base query, is shown. The query builder window 1210 illustratively includes a field 1220 for input of a query title. By way of example, the title "HCT % BLD STATISTICS" has been input for the abstract query. The query builder window 1210 further includes a result criteria specification area 1222, a selection criteria specification area 1224, a grouping operation selection field 1280, a query summary display area 1226, a checkbox 1228 and a plurality of pushbuttons 1290, 1292, 1294 and 1296.

The result criteria specification area 1222 is adapted for specification of result criteria. To this end, the user can select one or more result fields from a selection field 1230. If more than one result field is selected, the selected result fields can be combined using operators, which can be selected from a selection field 1235. After selection of each interesting result field, a pushbutton "APPLY" 1240 can be clicked to include the selected result field in the abstract query. When the result field selection is completed, a pushbutton "FINISHED" 1245 can be clicked to indicate completion.

The selection criteria specification area 1224 is adapted for specification of selection criteria. More specifically, using the selection criteria specification area 1224, the user can specify one or more query conditions. To this end, one or more condition fields can be selected from a selection field 1250. For each selected condition field, a query condition operator can be determined using a selection field 1255 and a condition value can be assigned to the selected condition field using the input field 1260. If more than one condition field is selected, the selected condition fields can be combined using operators, which can be selected from a selection field 1265. After specification of each query condition, a pushbutton "APPLY" 1270 can be clicked to include the specified query condition in the abstract query. When the query condition specification is completed, a pushbutton "FINISHED" 1265 can be clicked to indicate completion.

Using the grouping operation selection field 1280, a result field can be determined by which corresponding query results should be grouped. When grouping operation selection is completed, a pushbutton "FINISHED" 1285 can be clicked to indicate completion. Furthermore, in one embodiment, during creation of the abstract query, the query summary display area 1226 continuously indicates a current creation state in summarizing all actually provided information for creation of the abstract query.

By clicking the pushbutton "BUILD AGGREGATION QUERY" 1296, display of a GUI for specification of an aggregation query is launched. For instance, if the created abstract query is an abstract base query, one or more aggregation queries can be crafted based on the abstract base query. An illustrative GUI for specification of an aggregation query is explained in more detail below with reference to FIGS. 9-11. The checkbox 1228 then enables the user to determine how to run the created abstract query against the database. Specifically, if the checkbox 1228 is clicked, the created abstract query can be run as an aggregation query against the data in the database. If, however, the checkbox 1228 is not clicked, the created abstract query can be run as a base query against the data in the database.

In one embodiment, by clicking the pushbutton "SAVE" 1292, the abstract query can be stored in memory as a persistent query data object (e.g., query data object 620 of FIG. 6). By clicking the pushbutton "LOAD" 1294, a desired query data object can be retrieved from memory. To this end, for instance, a corresponding title of a query data object can be input into the field 1220 before clicking the pushbutton "LOAD" 1294. Accordingly, a given query data object can be retrieved from memory at any time and executed as a base query or an aggregation query against the database according to the selection made via the checkbox 1228.

By clicking the pushbutton "EXECUTE" 1290, the created abstract query as displayed in the query summary display area 1226 is transformed into an executable query (as explained above with respect to FIGS. 4-5). The executable query is then executed against the data in the database.

By way of example, the exemplary abstract base query shown in Table III below is created using the query builder window 1210 (for brevity, only parts that are relevant for the following explanations are shown). The exemplary abstract base query is issued to determine the patient_id, gender, race, and results of a test called "Hct % Bld" for every person in a database (e.g., database 130 of FIG. 1) having "Hct % Bld" test values between 50 and 100. The "Hct % Bld" test is a common medical test where hemoglobin is measured as a percentage of blood. By way of illustration, the exemplary abstract base query is defined using XML. However, any other language may be used to advantage.

TABLE III

ABSTRACT BASE QUERY EXAMPLE

| | |
|---|---|
| 001 | <?xml version="1.0"?> |
| 002 | <QueryAbstraction> |
| 003 |   <Selection> |
| 004 |     <Condition field="Hct%Bld" operator=">" value="50"/> |
| 005 |     <Condition field="Hct%Bld" operator="<" value="100"/> |
| 006 |   </Selection> |
| 007 |   <Results> |
| 008 |     <Field name="Patient_ID"/> |
| 009 |     <Field name="Gender"/> |
| 010 |     <Field name="Race"/> |
| 011 |     <Field name="Hct%Bld"/> |
| 012 |   </Results> |
| 013 | </QueryAbstraction> |

As can be seen from lines 003-006, the exemplary abstract base query specifies as selection criterion that only data records having Hct % Bld values between 50 and 100 should be selected and returned. Furthermore, in lines 007-012 the exemplary abstract base query specifies four different result fields, "Patient_ID", "Gender", "Race" and "Hct % Bld".

The exemplary abstract base query can be transformed into a concrete (i.e., executable) base query shown in Table IV below. By way of illustration, the exemplary concrete base query is defined using SQL. However, any other language may be used to advantage.

TABLE IV

EXEMPLARY CONCRETE SQL BASE QUERY

| | |
|---|---|
| 001 | SELECT Patient_ID, Gender, Race, Hct%Bld |
| 002 | FROM Patientinfo, Testresults |
| 003 | WHERE Hct%Bld>50 AND Hct%Bld<100 AND |
| 004 | Patientinfo.Patient_ID=Testresults.Patient_ID |

As can be seen from line 002, the exemplary concrete SQL base query is executed against two tables in the database, i.e., the tables "Patientinfo" and "Testresults". The database tables have been determined from a corresponding data abstraction model (e.g., data abstraction model 124 of FIG. 1) used for transforming the exemplary base query of Table III into the concrete SQL base query of Table IV. Exemplary database tables "Patientinfo" and "Testresults" are shown in Tables V and VI below.

TABLE V

EXEMPLARY DATABASE TABLE "PATIENTINFO"

| 001 | Patient_ID | Age | Race | Gender | City |
|---|---|---|---|---|---|
| 002 | 1 | 45 | American | M | Rochester |
| 003 | 2 | 17 | Russian | F | LaCrosse |
| 004 | 3 | 33 | American | M | Rochester |
| 005 | 4 | 9 | American | F | LaCrosse |
| 006 | 5 | 16 | Asian | F | Rochester |
| 007 | 6 | 72 | American | M | LaCrosse |
| 008 | 7 | 15 | Asian | M | Rochester |
| 009 | 8 | 29 | Caucasian | M | LaCrosse |
| 010 | 9 | 80 | American | M | Rochester |
| 011 | 10 | 75 | Hispanic | M | LaCrosse |
| 012 | 11 | 53 | Hispanic | F | Rochester |
| 013 | 12 | 67 | German | F | LaCrosse |
| 014 | 13 | 31 | Asian | M | Rochester |
| 015 | 14 | 47 | American | F | LaCrosse |
| 016 | 15 | 19 | American | M | Rochester |
| 017 | 16 | 28 | Asian | M | LaCrosse |

TABLE VI

EXEMPLARY DATABASE TABLE "TESTRESULTS"

| 001 | Patient_ID | Hct % Bld | Hemoglobin |
|---|---|---|---|
| 002 | 8 | 54.9 | 10 |
| 003 | 13 | 92.3 | 9 |
| 004 | 2 | 74.7 | — |
| 005 | 4 | 61.4 | — |
| 006 | 16 | 20.2 | 10 |
| 007 | 5 | 34.9 | — |
| 008 | 11 | 82.3 | 9 |
| 009 | 12 | 64.7 | 9 |
| 010 | 14 | 41.4 | 10 |
| 011 | 1 | 70.7 | — |

As can be seen from Tables V and VI, the "Patientinfo" table illustratively contains age, race, gender and address (city) information about each patient. The "Testresults" table illustratively contains results of an Hct % Bld and an Hemoglobin test for a plurality of patients. Both tables illustratively contain a "Patient_ID" column that uniquely identifies each patient. By way of example, the "Patientinfo" table has a one-to-many relationship with the "Testresults" table. In other words, for each patient there is only one entry in the "Patientinfo" table, but there may be several entries in the "Testresults" table, since a given patient may have had the Hct % Bld and/or Hemoglobin tests done more than once.

Upon execution of the exemplary concrete SQL base query against the database tables illustrated in Tables V and VI, the result table illustrated in Table VII below is returned.

TABLE VII

EXEMPLARY CONCRETE SQL QUERY RESULTS

| 001 | Patient_ID | Hct % Bld | Race | Gender |
|---|---|---|---|---|
| 002 | 8 | 54.9 | Caucasian | M |
| 003 | 13 | 92.3 | Asian | M |
| 004 | 2 | 74.7 | Russian | F |
| 005 | 4 | 61.4 | American | F |
| 006 | 11 | 82.3 | Hispanic | F |
| 007 | 12 | 64.7 | German | F |
| 008 | 1 | 70.7 | American | M |

Figure 7:
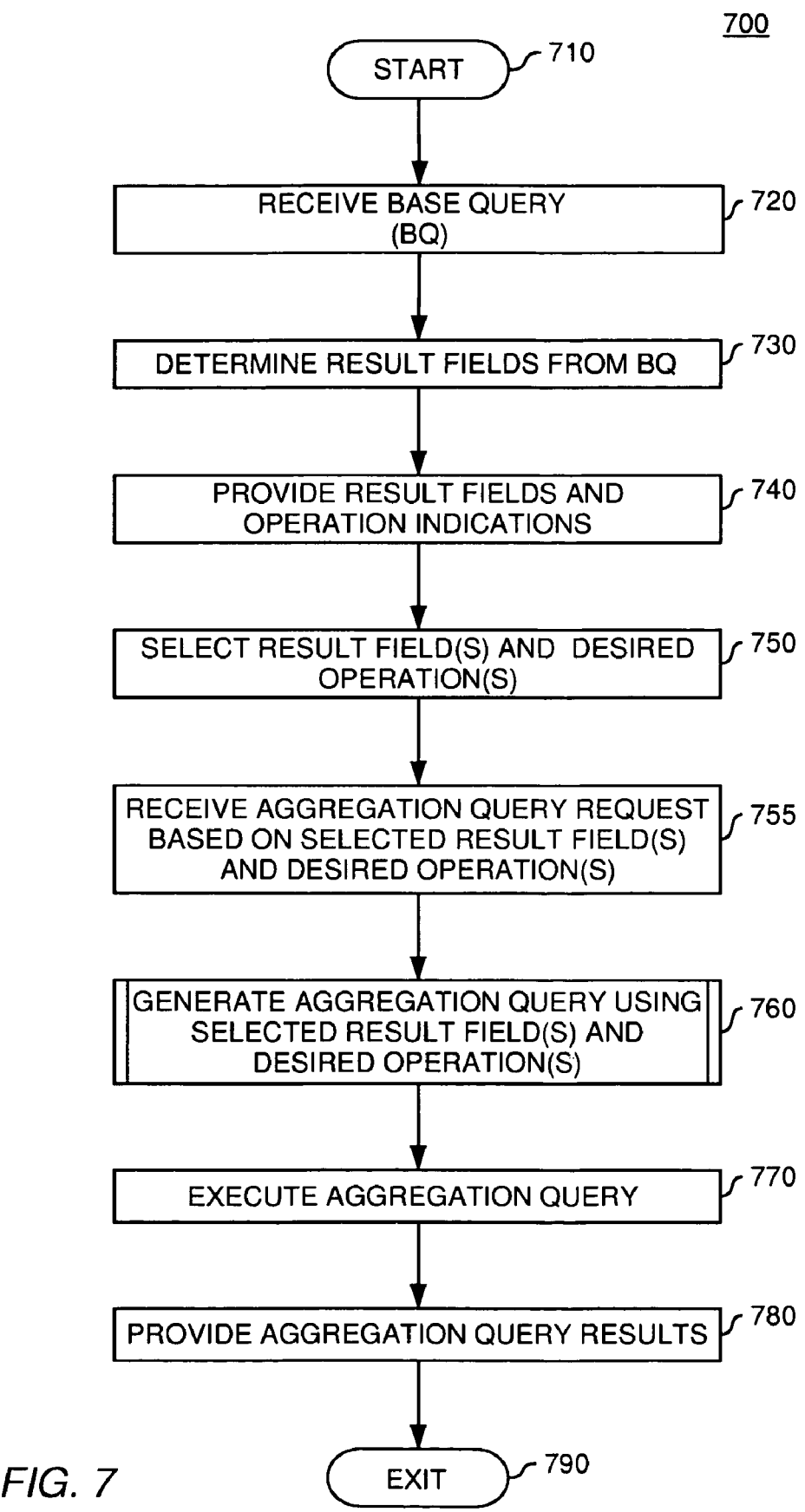
FIG. 7 is a flow chart illustrating a method for providing aggregation information in one embodiment.

Referring now back to FIG. 7, at step 730 the aggregation query manager determines the result fields contained in the received base query. By way of example, the result fields "Patient_ID", "Gender", "Race" and "Hct % Bld" can be determined from the abstract base query according to Table III above. Alternatively, the result fields can be determined from the concrete SQL base query, such as the concrete SQL base query of Table IV above.

At step 740, the determined result fields are provided to the user via a user interface. Thus, the determined result fields can be used as candidates for a subsequent aggregation query. Furthermore, indications for available aggregation operations are provided to the user using the user interface.

In one embodiment, the determined result fields and a selectable indication for each selectable aggregation operation of a plurality of aggregation operations are displayed in a graphical user interface (GUI). The GUI is configured to enable the user to select one or more result fields and to associate each selected result field with a desired operation by selecting the corresponding selectable indication of the desired aggregation operation.

Figure 9:
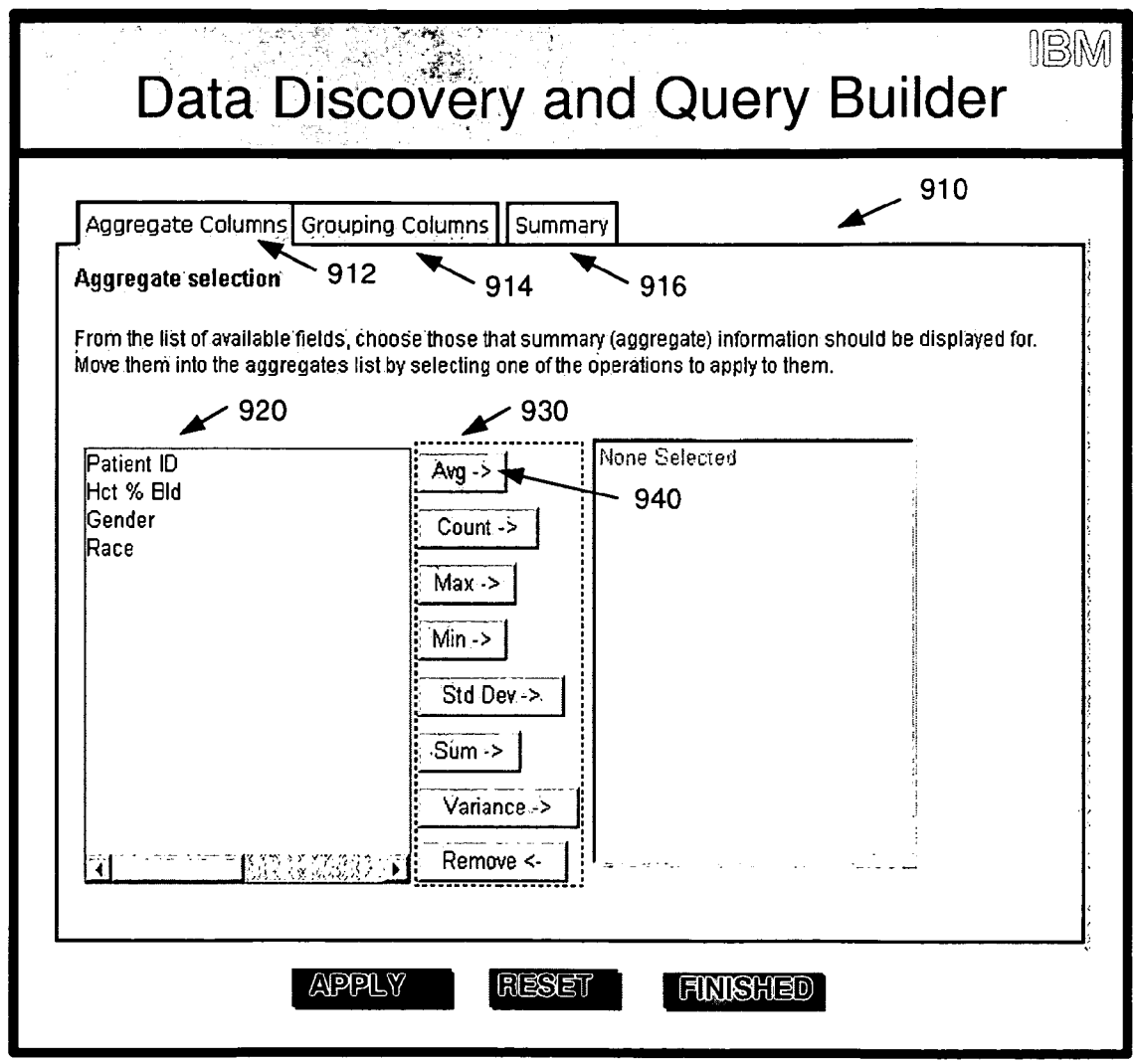
FIGS. 9-10 are screen shots illustrating an interface for selection of an aggregation operation for a query result field in one embodiment.

Referring now to FIG. 9, an illustrative GUI screen 900 is shown. By way of example, if the pushbutton "BUILD AGGREGATION QUERY" 1296 in FIG. 12 is clicked, the GUI screen 900 is displayed. The GUI screen 900 shows three selectable tabs, an "Aggregate Columns" tab 912, a "Grouping Columns" tab 914 and a "Summary" tab 916. When the "Aggregate Columns" tab 912 is selected, a first panel 910 is displayed. The panel 910 includes a result field window 920 having one or more result fields, and a plurality of graphical selection elements 930 (shown as "buttons"). A button is provided for each selectable aggregation operation of a plurality of aggregation operations. The result field window 920 and the buttons 930 enable for selection of one or more of the result field(s) and one or more of the selectable aggregation operations. For example, the buttons 930 include a button 940 "Avg" which can be clicked to associate an averaging aggregation operation with the corresponding selected result field. The averaging operation may be configured to determine an average value of data related to the corresponding selected result field Referring again to FIG. 7, at step 750 one or more of the displayed result fields are selected (i.e., from the result field window 920 of FIG. 9). Furthermore, one or more aggregation operations are selected (i.e., by clicking on the corresponding buttons 930).

Figure 10:
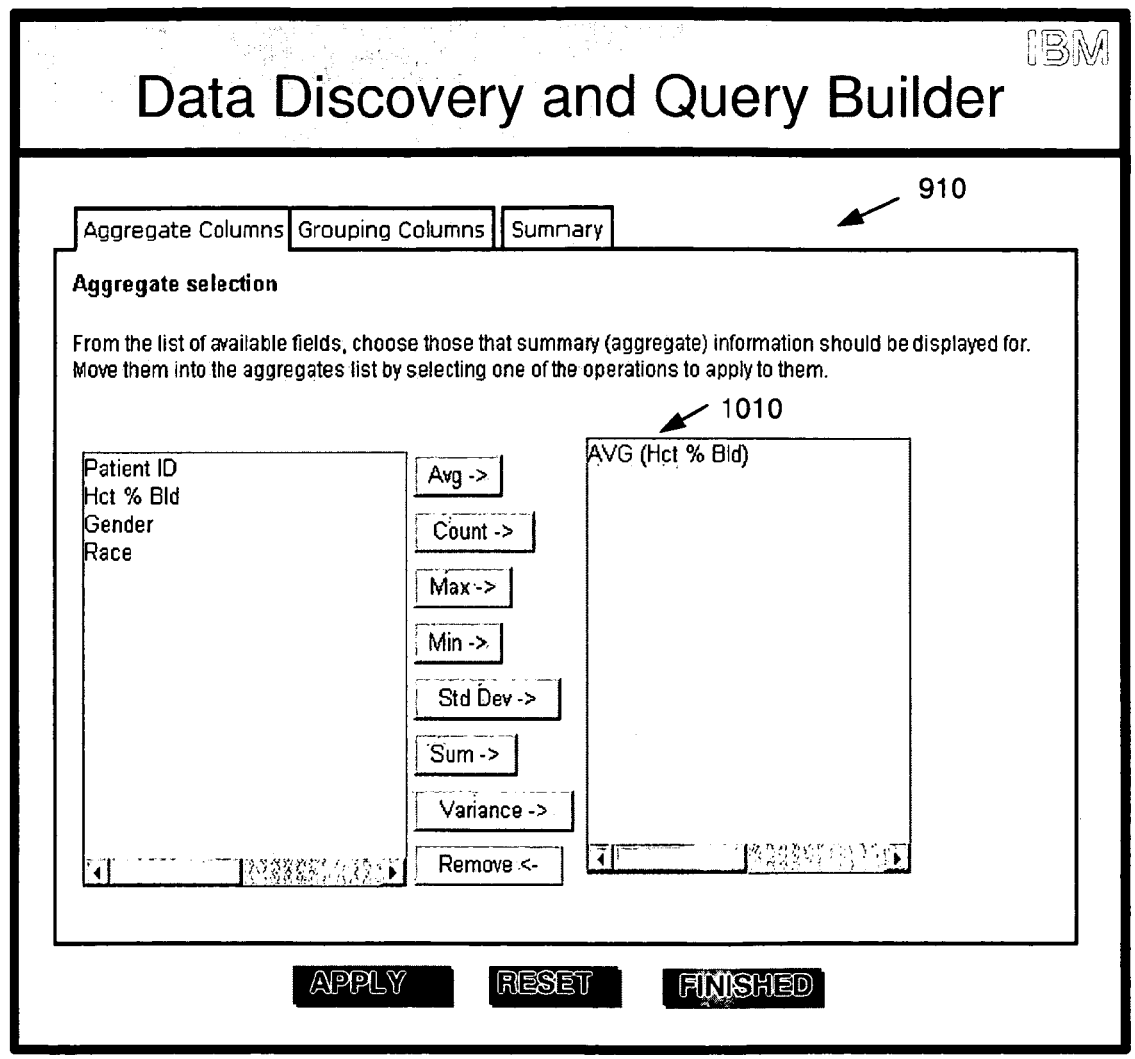

Referring now to FIG. 10, the panel 910 of the GUI screen 900 of FIG. 9 is shown after selection of a result field "Hct % Bld" from the result field window 920 and a click on the "Avg" button 940. In other words, the panel 910 illustrates in a selection window 1010 that an "Avg" aggregation operation has been selected for the result field "Hct % Bld", whereby the "Avg" aggregation operation is configured to determine an average value of the data related to the "Hct % Bld" result field.

Referring again to FIG. 7, in one embodiment step 750 includes selection of one or more grouping operations. For instance, in SQL a grouping operation is performed using a "GROUP BY" statement for grouping returned data according to data of a result field that is specified in the "GROUP BY" statement. Accordingly, for one or more selected result fields, a grouping operation can be selected.

Figure 11:
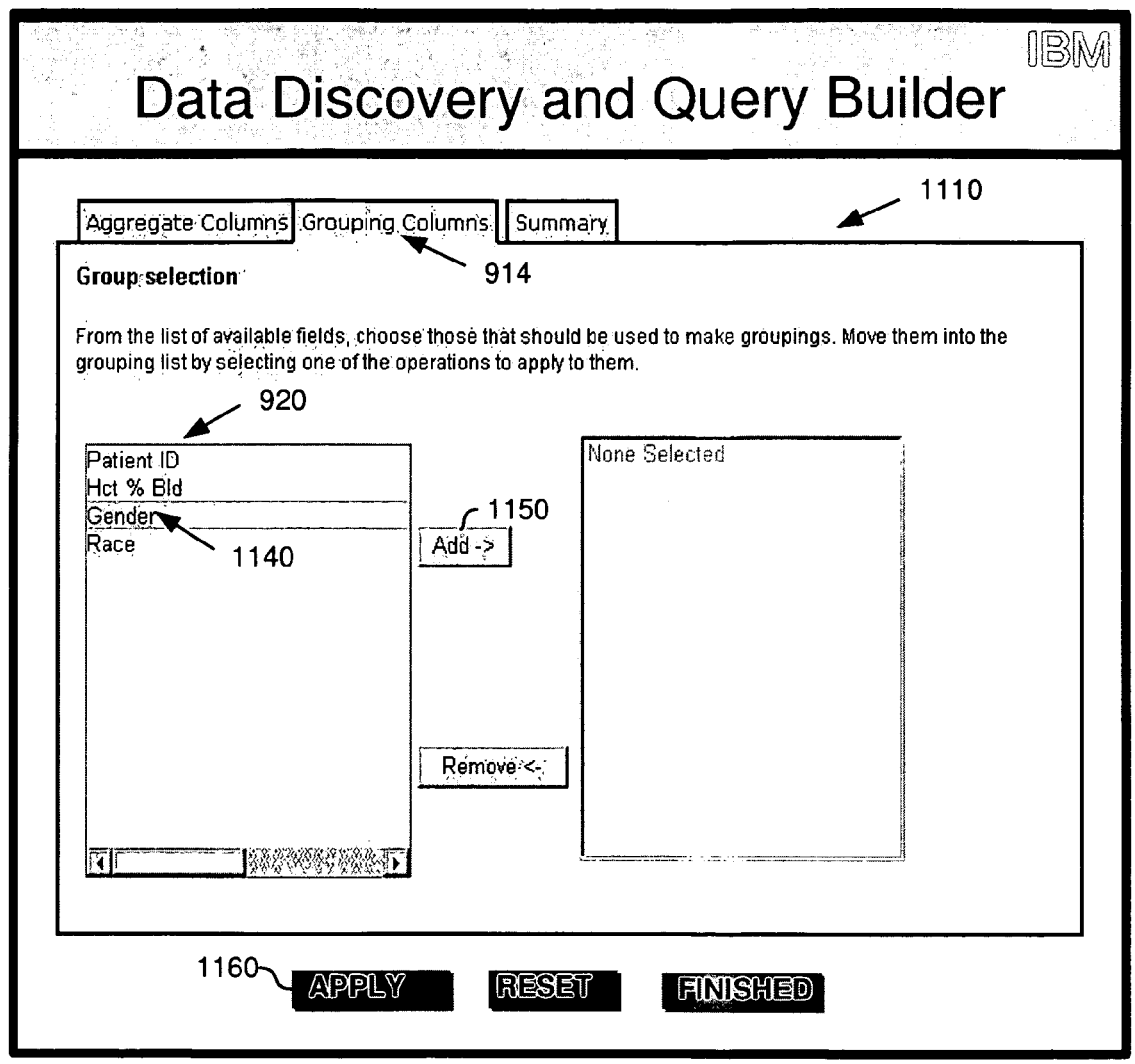
FIG. 11 is a screen shot illustrating an interface for selection of a grouping operation for a query result field in one embodiment.

Referring now to FIG. 11, a panel 1110 of the GUI screen 900 of FIG. 9 is shown after selection of the "Grouping Columns" tab 914. The panel 1110 includes the result field window 920. Furthermore, the panel 1110 includes an exemplary "Add" button 1150 which can be selected for associating a grouping operation with a selected result field. By way of example, a result field 1140 "Gender" has been selected for grouping. Upon selection, the selected result field 1140 has been highlighted in the result field window 920. If subsequently the "Add" button 1150 is clicked, a result of a corresponding aggregation query is grouped according to the selected result field 1140. In one embodiment, when the user has completed selection of result fields, aggregation operations and grouping operations from panels 910 and 1110, a "FINISHED" button 1160 can be clicked to generate corresponding aggregation query components based on the selected result fields, aggregation operations and grouping operations.

Referring again to FIG. 7, at step 755, the aggregation query manager receives the selected aggregation query components (e.g., aggregation query components 610 of FIG. 6) including one or more of the result fields contained in the abstract base query. The received aggregation query components associate each selected result field with a selected aggregation operation. As an example, an exemplary abstract aggregation query component representation is shown in Table VIII below (for brevity, only parts that are relevant for the following explanations are shown). The exemplary abstract aggregation query component representation illustrates a request to retrieve the gender and the results of the "Hct % Bld" test for every person in the database having "Hct % Bld" test values between 50 and 100, and to determine the average of the results of the "Hct % Bld" test values with respect to each gender. Upon execution of a corresponding aggregation query, a result should be displayed that only comprises data records which are grouped by the gender.

TABLE VIII

AGGREGATION QUERY COMPONENT REPRESENTATION EXAMPLE

| | |
|---|---|
| 001 | Find |
| 002 |   Gender |
| 003 |   The average of all "Hct%Bld" tests |
| 004 | For Each |
| 005 |   Gender |
| 006 | Where |
| 007 |   "Hct%Bld" tests exist that are between 50 and 100 |

Based on the exemplary abstract aggregation query components, a query data object (e.g., query data object 620 of FIG. 6) representing the abstract base query is stored in memory. The query data object includes the abstract aggregation query components. For instance, after clicking the "FINISHED" button 1160 in the panel 1110 of FIG. 11, display returns to the GUI screen 1200 of FIG. 12. Using the query builder 1210 of the GUI screen 1200, the user can click the pushbutton 1292 for persistently storing the query data object. Furthermore, by clicking the checkbox 1228, the user can request to transform the query data object into an aggregation query.

As an example, the exemplary abstract aggregation query shown in Table IX is generated on the basis of the abstract base query shown in Table III according to the abstract aggregation query components illustrated in Table VIII. By way of illustration, the exemplary abstract aggregation query is defined using XML. However, any other language may be used to advantage.

TABLE IX

ABSTRACT AGGREGATION QUERY EXAMPLE

| | |
|---|---|
| 001 | <?xml version="1.0"?> |
| 002 | <QueryAbstraction> |
| 003 |   <Selection> |
| 004 |     <Condition field="Hct%Bld" operator=">" value="50"/> |
| 005 |     <Condition field="Hct%Bld" operator="<" value="100"/> |
| 006 |   </Selection> |
| 007 |   <Results> |
| 008 |     <Field name="Gender" /> |
| 009 |     <Field name="Hct%Bld " operator="AVG" /> |
| 010 |   </Results> |
| 011 |   <GroupBy> |
| 012 |     <Field name="Gender"/> |
| 013 |   </GroupBy> |
| 014 | </QueryAbstraction> |

As can be seen from lines 003-006, the exemplary abstract aggregation query specifies as data selection condition that only data records having an Hct % Bld value between 50 and 100 should be retrieved. In lines 007-010 the exemplary abstract aggregation query specifies that data related to two different result fields should be displayed, i.e., data related to the result fields "Gender" and "Hct % Bld". Furthermore, line 009 includes an "operator" expression which has the value "AVG" indicating that the result field "Hct % Bld" is operated on by an averaging function. Line 012 indicates that the data to be displayed should be grouped by gender.

At step 760, a concrete aggregation query is generated using the selected result field(s), aggregation operation(s) and grouping operation(s). In other words, the abstract aggregation query is transformed into the concrete (i.e., executable) aggregation query. Generation of the concrete aggregation query is described in more detail below with reference to FIG. 8.

An exemplary concrete aggregation query corresponding to the abstract aggregation query of Table IX is shown in Table X below. By way of illustration, the exemplary concrete aggregation query is defined using SQL. However, any other language may be used to advantage.

TABLE X

EXEMPLARY CONCRETE SQL AGGREGATION QUERY

| | |
|---|---|
| 001 | SELECT Gender, AVG(Hct%Bld) |
| 002 | FROM Patientinfo, Testresults |
| 003 | WHERE Hct%Bld>50 AND Hct%Bld<100 AND |
| 004 |     Patientinfo.Patient_ID=Testresults.Patient_ID |
| 005 | GROUP BY Gender |

At step 770, the concrete aggregation query is executed against the database. At step 780, an obtained aggregation query result is provided to the user.

For instance, upon execution of the exemplary concrete SQL aggregation query of Table X above against the database tables illustrated in Tables V and VI, the aggregation query result illustrated in Table XI below is displayed.

TABLE XI

EXEMPLARY AGGREGATION QUERY RESULTS

| Hct % Bld | Gender |
|---|---|
| 72.63 | M |
| 70.775 | F |

According to line 001 of the exemplary concrete SQL aggregation query of Table X, two result field columns are displayed in Table XI, an "Hct % Bld" and a "Gender" column. Furthermore, the "Hct % Bld" column contains average values of the Hct % Bld tests. According to lines 002 and 003 of the exemplary concrete SQL aggregation query of Table X, the average values in the "Hct % Bld" column have been determined for each person in the tables "Patientinfo" and "Testresults" having Hct % Bld values between 50 and 100. According to line 005 of the exemplary concrete SQL aggregation query of Table X, the average Hct % Bld values are grouped by gender. Accordingly, only two average values have been determined, one for the male gender (represented by "M") and another for the female gender (represented by "F"). Method 700 then exits at step 790.

Figure 8:
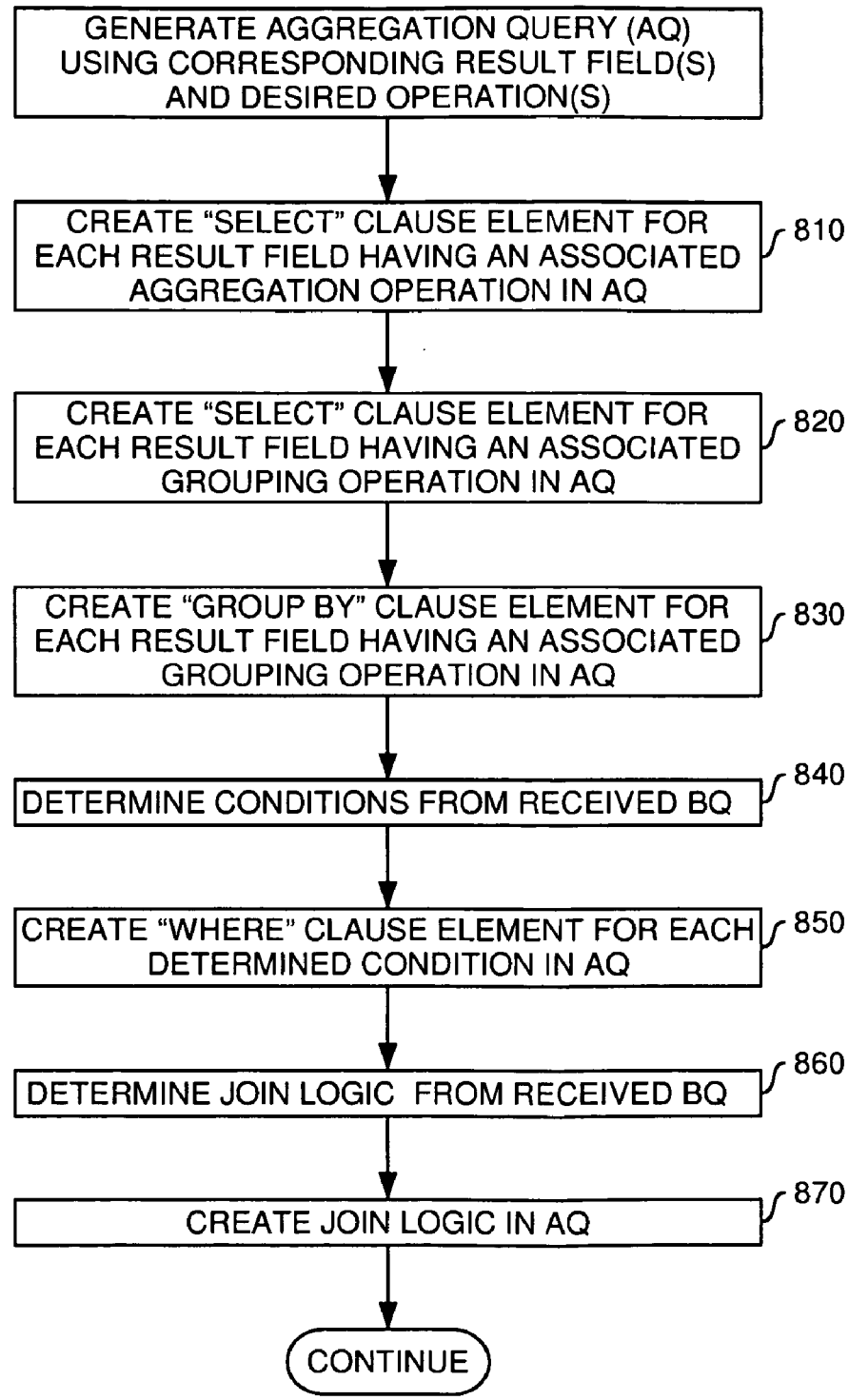
FIG. 8 is a flow chart illustrating a method for generating an SQL aggregation query in one embodiment of the invention.

Referring now to FIG. 8, one embodiment of a method 800 for generation of the concrete aggregation query according to step 760 of FIG. 7 is illustrated. At least several steps of the method 800 can be performed by an aggregation query manager (e.g., aggregation query manager 128 of FIG. 1). By way of example, generation of a concrete SQL aggregation query from an abstract aggregation query is described. However, it should be understood that the use of SQL is merely illustrative and that any other, known or unknown, high-level query language is contemplated.

At step 810, a SELECT statement is added to the concrete SQL aggregation query. Furthermore, each selected result field having an associated aggregation operation is determined. For each determined result field having an associated aggregation operation (e.g., according to line 011 of Table IX, the "Hct % Bld" result field is operated on by an averaging function), a SELECT clause element is created in the SELECT statement of the concrete SQL aggregation query. The SELECT clause element associates the determined result field having an associated aggregation operation with the associated aggregation operation. By way of example, the SELECT clause element "AVG(Hct % Bld)" shown in line 001 of Table X associates the Hct % Bld result field with the averaging function.

At step 820, each selected result field having an associated grouping operation is determined. For each determined result field having an associated grouping operation (e.g., according to line 014 of Table IX, the "Gender" result field should be used for grouping the aggregation query result), a SELECT clause element is created in the SELECT statement of the concrete SQL aggregation query. By way of example, the SELECT clause element "Gender" shown in line 001 of Table X is created. However, result fields which have neither an associated aggregation operation nor an associated grouping operation are not added to the SELECT statement.

At step 830, a GROUP BY statement is added to the concrete SQL aggregation query. The GROUP BY statement includes a GROUP BY clause element for each determined result field having an associated grouping operation. Accordingly, in the present example, a GROUP BY clause element has been created for the "Gender" result field in the concrete SQL aggregation query of Table X (line 005).

At step 840, a WHERE statement is added to the concrete SQL aggregation query. Furthermore, data selection conditions (e.g., data selection conditions 304 of FIG. 3) are determined from the abstract aggregation query. For each determined condition, a WHERE clause element is created in the WHERE statement of the concrete SQL aggregation query at step 850. For instance, the conditions in lines 004-005 of the exemplary abstract aggregation query of Table IX above are determined and corresponding WHERE clause elements are created, as shown in line 003 of the concrete aggregation query of Table X.

At step 860, a determination is made regarding the join logic needed to join all database tables referenced by any result field in the SELECT statement or the WHERE statement. In one embodiment, the join logic is determined from the data abstraction model 124 (FIG. 1). For the determined join logic, FROM or WHERE clause elements are created in corresponding FROM or WHERE statements of the SQL aggregation query at step 870. For instance, in the present example a FROM statement is added to the concrete SQL aggregation query and FROM clause elements are created, as shown in line 002 of the concrete SQL aggregation query of Table X, to indicate that the two database tables "Patientinfo" and "Testresults" are queried by the concrete SQL aggregation query. Furthermore, a WHERE clause element has been created in the WHERE statement of the concrete SQL aggregation query as shown in line 004 of Table X to indicate that the two database tables "Patientinfo" and "Testresults" are joined by a key "Patient_ID". Processing then continues with execution of the concrete SQL aggregation query against the database tables "Patientinfo" and "Testresults" at step 770 of method 700 according to FIG. 7.

In various embodiments, the invention provides numerous advantages over the prior art. For instance, based on a given base query a plurality of different aggregation queries can be generated using a GUI as shown in FIGS. 9-12. To this end, a query data object containing the information of both the abstract base query and the abstract aggregation query is persistently stored in memory. In other words, the query data object contains result criteria logic, selection criteria logic and aggregation/grouping logic of the abstract base query and the abstract aggregation query. In any case, the persistent data object(s) can be retrieved from memory and processed according to user requests. This can be helpful if, for example, at a later stage the user decides that something about the given base query needs further investigation. By way of example, results of a given aggregation query can be disputed by an expert in the company. Or it may be deemed that corresponding statistics show promising signs for research studies. In such cases, it can be desirable to get back from the given aggregation query to base query level information.

On the basis of the query data object, a user may select how to run the query data object in executable form against a database. That is, the user selects whether the application issues a request to execute the abstract base query or the abstract aggregation query. In one embodiment, this selection is made possible by the provision of a checkbox in the graphical user interface shown in FIG. 12. Based on the user's checkbox selection, the query data object will be transformed into either the concrete SQL base query or the concrete SQL aggregation query. In another embodiment, a checkbox can be provided that allows the user to 'de-aggregate' a given aggregation query to return to the base query at any time. By simply 'de-aggregating' the given aggregation query, only the information that is available in the base query would again be displayed.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program which, when executed by a processor, performs a process of constructing queries selectively capable of returning aggregation information related to data in a database, the process comprising:

in response to input specifying attributes for an abstract query, generating an object containing entities including at least one result criterion, selection criteria, an aggregation operation and aggregation logic associating the aggregation operation with the at least one result criterion; wherein the at least one result criterion for the abstract query comprises one or more logical fields, each corresponding to a logical field specification of a data abstraction model abstractly describing the data in the database, each result criterion corresponding to a respective one of the one or more logical fields for which data is to be returned; and wherein the aggregation operation is to be performed with respect to the at least one result criterion for generating aggregation information; and accessing the object to selectively (i) generate a first executable query corresponding to the abstract query inclusive of the aggregation operation and aggregation logic; and (ii) generate a second executable query corresponding to the abstract query exclusive of the aggregation operation and aggregation logic.

2. The computer-readable storage medium of claim 1, wherein the process further comprises:

receiving a user selection to perform the aggregation operation with respect to the at least one result criterion;

determining, from the object, the selection criterion, the at least one result criterion, the aggregation operation and the aggregation logic; and generating the executable query on the basis of the determined selection criterion, the at least one result criterion, the aggregation operation and aggregation logic.

3. The computer-readable storage medium of claim 1, wherein the process further comprises:

receiving a user selection not to perform the aggregation operation with respect to the at least one result criterion;

in response to the user selection, determining the selection criterion and the at least one result criterion from the object; and generating an executable query on the basis of the determined selection criterion and the at least one result criterion, exclusive of the aggregation operation and the aggregation logic.

4. The computer-readable storage medium of claim 1, wherein the abstract query comprises at least a first and a second result criterion, the first result criterion being associated with the aggregation operation and the second result criterion being associated with a grouping operation to define a result group for the abstract query.

5. The computer-readable storage medium of claim 1, wherein the process further comprises:

displaying a user interface allowing user selection of the selection criteria, the at least one result criterion and the aggregation operation.

6. The computer-readable storage medium of claim 5, wherein the displaying comprises:

displaying a selection element allowing the user selection of whether to perform the aggregation operation with respect to the at least one result criterion.

7. A computer-readable storage medium containing a program which, when executed by a processor, performs a process of running queries selectively capable of returning aggregation information related to data in a database, the process comprising:

retrieving an abstract query comprising one or more logical fields, each corresponding to a logical field specification of a data abstraction model abstractly describing the data residing in the database, the one or more logical fields defining selection criteria, at least one result criterion and an aggregation operation to be performed with respect to the at least one result criterion, wherein the selection criteria, the at least one result criterion and the aggregation operation are contained in an object;

receiving input specifying that the aggregation operation is to be applied to the at least one result criterion of the abstract query;

after executing a first executable query corresponding to the abstract query inclusive of the aggregation operation, displaying results including aggregation information for the at least one result criterion;

receiving input specifying that the aggregation operation is to be excluded from the abstract query; and after executing a second executable query corresponding to the abstract query exclusive of the aggregation operation, displaying results exclusive of aggregation information for the at least one result criterion.

8. The computer-readable storage medium of claim 7, wherein the process further comprises, after receiving the input specifying that the aggregation operation is to be applied to the at least one result criterion:

determining, from the object, the selection criterion, the at least one result criterion and the aggregation operation; and generating the first executable query on the basis of the determined selection criterion, the at least one result criterion and the aggregation operation, wherein aggregation operation is applied to the at least one result criterion, the first executable query being an SQL query.

9. The computer-readable storage medium of claim 7, wherein the process further comprises, after receiving the input specifying that the aggregation operation is to be excluded from the abstract query:

determining, from the object, the selection criterion and the at least one result criterion; and generating the second executable query on the basis of the determined selection criterion and the at least one result criterion, the second executable query being an SQL query.

10. The computer-readable storage medium of claim 7, wherein the abstract query comprises at least a first and a second result criterion, the first result criterion being associated with the aggregation operation and the second result criterion being associated with a grouping operation to define a result group for the abstract query.

11. The computer-readable storage medium of claim 10, wherein the process further comprises, after receiving the input specifying that the aggregation operation is to be applied to the first result criterion:
 generating the first executable query in SQL, comprising:
  creating a SELECT clause element in the SQL query for the first result criterion;
  creating a SELECT clause element in the SQL query for the second result criterion; and
  creating a GROUP BY clause element in the SQL query for the second result criterion.

12. A computer-readable storage medium containing a program which, when executed by a processor, performs a process of constructing queries selectively capable of returning aggregation information related to data in a database, the process comprising:
 in response to input specifying attributes for an abstract query, generating an object containing entities including at least one result criterion, selection criteria, an aggregation operation and aggregation logic associating the aggregation operation with the at least one result criterion; wherein the at least one result criterion for the abstract query comprises one or more logical fields, each corresponding to a logical field specification of a data abstraction model abstractly describing the data in the database, each result criterion corresponding to a respective one of the one or more logical fields for which data is to be returned; and wherein the aggregation operation is to be performed with respect to the at least one result criterion for generating aggregation information;
 accessing the object to selectively (i) generate a first executable query corresponding to the abstract query inclusive of the aggregation operation and aggregation logic; and (ii) generate a second executable query corresponding to the abstract query exclusive of the aggregation operation and aggregation logic; and
 transforming the abstract query into the executable query for execution against the data in the database.

* * * * *